US012598666B2

(12) United States Patent
Wu et al.

(10) Patent No.: US 12,598,666 B2
(45) Date of Patent: Apr. 7, 2026

(54) METHOD AND APPARATUS FOR CHO AND FAST MCG LINK RECOVERY

(71) Applicant: Lenovo (Beijing) Ltd., Beijing (CN)

(72) Inventors: Lianhai Wu, Chaoyang (CN); Ran Yue, Haidian District (CN); Jing Han, Chaoyang District (CN); Haiming Wang, Xicheng District (CN); Jie Shi, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 442 days.

(21) Appl. No.: 17/912,755

(22) PCT Filed: Mar. 27, 2020

(86) PCT No.: PCT/CN2020/081760
§ 371 (c)(1),
(2) Date: Sep. 19, 2022

(87) PCT Pub. No.: WO2021/189442
PCT Pub. Date: Sep. 30, 2021

(65) Prior Publication Data
US 2023/0145958 A1 May 11, 2023

(51) Int. Cl.
*H04W 76/19* (2018.01)
*H04W 36/00* (2009.01)

(52) U.S. Cl.
CPC ....... *H04W 76/19* (2018.02); *H04W 36/0055* (2013.01); *H04W 36/0061* (2013.01); *H04W 36/00837* (2018.08)

(58) Field of Classification Search
CPC .......................... H04W 76/19; H04W 36/0061
(Continued)

(56) References Cited

U.S. PATENT DOCUMENTS

| | | | |
|---|---|---|---|
| 2019/0223073 A1 | 7/2019 | Chen et al. | |
| 2021/0136646 A1* | 5/2021 | Tseng ................ | H04W 36/0088 |
| 2025/0227795 A1 | 7/2025 | Wu et al. | |

FOREIGN PATENT DOCUMENTS

| | | |
|---|---|---|
| CN | 110072244 A | 7/2019 |
| CN | 110121187 A | 8/2019 |
| CN | 110913428 A | 3/2020 |

OTHER PUBLICATIONS

3rd Generation Partnership Project; Technical Specification Group Radio Access Network; Evolved Universal Terrestrial Radio Access (E-UTRA); Radio Resource Control (RRC); (Year: 2020).*

(Continued)

*Primary Examiner* — Sibte H Bukhari
(74) *Attorney, Agent, or Firm* — FIG. 1 Patents

(57) ABSTRACT

Embodiments of the present application relate to a method and an apparatus for Conditional handover (CHO) and fast MCG link recovery. According to an embodiment of the present application, a method can include: receiving fast master cell group (MCG) link recovery configuration information; receiving CHO configuration information indicating a set of CHO configurations and a set of execution conditions for a set of cells, each cell is associated with a CHO configuration and an execution condition; and evaluating the set of execution conditions based on the CHO configuration information. Embodiments of the present application can define the CE behavior when both the MCG link recovery procedure and the CHO procedure are configured for the UE.

20 Claims, 7 Drawing Sheets

(58) Field of Classification Search
USPC ........................................................ 370/331
See application file for complete search history.

(56) References Cited

OTHER PUBLICATIONS

Ericsson, "CapturingRRCPositioningImpactsafterRAN2-109bis",3GPPTSG-RANWG2Meeting#109bis-eR2-2003880, May 5, 2020(816pages).(Year:2020) (Year: 2020).*

3rdGeneration PartnershipProject; TechnicalSpecificationGroupRadioAccess Network; EvolvedUniversalTerrestrialRadioAccess(E-UTRA):; Radio ResourceControl(RRC);(Year:2020) (Year: 2020).*

20927942.1 , "Extended European Search Report", EP Application No. 20927942.1, Nov. 22, 2023, 17 pages.

3GPP , "Evolved Universal Terrestrial Radio Access (E-UTRA)", TS 36.331 V16.0.0, clause 5.3.5.x, clause 5.3.10.7, clause 5.3.11.3, and clause 7.3.1 <2 of 3>, Mar. 2020, 178 pages.

3GPP , "Evolved Universal Terrestrial Radio Access (E-UTRA)", TS 36.331 V16.0.0, clause 5.3.5.x, clause 5.3.10.7, clause 5.3.11.3, and clause 7.3.1, <1 of 3>, Mar. 2020, 178 pages.

3GPP , "Evolved Universal Terrestrial Radio Access (E-UTRA)", TS 36.331 V16.0.0, clause 5.3.5.x, clause 5.3.10.7, clause 5.3.11.3, and clause 7.3.1, <3 of 3>, Mar. 2020, 178 pages.

Ericsson , et al., "[108#28][R16 RRC] 38331 Rel-16 CR Merge", 3GPP TSG-RAN WG2 Meeting #109e, R2-2001086, Elbonia [retrieved Dec. 15, 2022]. Retrieved from the Internet <https://www.3gpp.org/ftp/tsg_ran/WG2_RL2/ TSGR2_109_e/Docs?sortby=sizerev>., Feb. 2020, 794 Pages.

ZTE Corporation , et al., "Discussion on fast RLF recovery when applying CHO and fast MCG recovery", 3GPP TSG RAN WG2 Meeting #109e, R2-2001260, Online, revision of R2-1914814 [retrieved Jan. 22, 2024]. Retrieved from the Internet <https://www.3gpp.org/ftp/tsg_ran/WG2_RL2/TSGR2_109_e/Docs>, Feb. 2020, 4 pages.

ZTE Corporation , et al., "Discussion on the fast RLF recovery with the applying of CHO and DC", 3GPP TSG RAN WG2 Meeting #107, R2-1910743, Prague, Czech Republic, Aug. 2019, 4 pages.

202080098930.9 , "Foreign Office Action", CN Application No. 202080098930.9, Oct. 26, 2024, 15 pages.

LG Electronics Inc. , "Consideration on Invalid Cell Handling in CHO", 3GPP TSG-RAN WG2 Meeting #107bis, R2-1913862, Chongqing, China [retrieved Oct. 25, 2022]. Retrieved from the Internet <https://www.3gpp.org/ftp/tsg_ran/WG2_RL2/TSGR2_107bis/Docs?sortby=namerev>., Oct. 2019, 3 Pages.

PCT/CN2020/081760 , "International Preliminary Report on Patentability", PCT Application No. PCT/CN2020/081760, Oct. 6, 2022, 6 pages.

PCT/CN2020/081760 , "International Search Report and Written Opinion", PCT Application No. PCT/CN2020/081760, Jan. 4, 2021, 8 pages.

ZTE , "Discussion on fast RLF recovery when applying CHO and fast MCG recovery", 3GPP TSG RAN WG2 Meeting #107bis, R2-1913484, Chongqing, China [retrieved Oct. 25, 2022]. Retrieved from the Internet <https://www.3gpp.org/ftp/tsg_ran/WG2_RL2/TSGR2_107bis/Docs>., Oct. 2019, 3 Pages.

"Foreign Office Action", European Application No. 20927942.1, Apr. 7, 2025, 40 pages.

"Foreign Office Action", CN Application No. 202080098930.9, Mar. 13, 2025, 12 pages.

* cited by examiner

600

METHOD AND APPARATUS FOR CHO AND FAST MCG LINK RECOVERY

TECHNICAL FIELD

Embodiments of the present application generally relate to wireless communication technology, especially to a method and an apparatus for conditional handover (CHO) and fast master cell group (MCG) link recovery.

BACKGROUND

In 3rd generation partnership project (3GPP) Release 16, a MCG link recovery procedure is introduced. The purpose of this procedure is to inform a radio link failure (RLF) in a MCG to a master node (MN), such that a user equipment (UE) in RRC_CONNECTED state may quickly perform a MCG link recovery procedure to continue the radio resource control (RRC) connection without performing a re-establishment procedure.

In addition, a CHO procedure is defined as a handover procedure that is executed by a UE when one or more handover execution conditions are met. In the CHO procedure, the UE may start evaluating execution condition(s) after receiving the CHO configuration information, and stop evaluating the execution condition during the CHO execution once the execution condition(s) is met.

Both the MCG link recovery procedure and the CHO procedure may be configured for a UE. However, how to handle the association between a fast MCG link recovery procedure and a CHO procedure have not been discussed in 3GPP 5G new radio (NR) technology yet.

Therefore, the industry desires an improved technology for CHO and fast MCG link recovery, so as to define the UE behavior when both the MCG link recovery procedure and the CHO procedure are configured for the UE.

SUMMARY

Some embodiments of the present application provide a technical solution for CHO and fast MCG link recovery.

According to some embodiments of the present application, a method may include: receiving fast master cell group (MCG) link recovery configuration information; receiving conditional handover (CHO) configuration information indicating a set of CHO configurations and a set of execution conditions for a set of cells, each cell is associated with a CHO configuration and an execution condition; and evaluating the set of execution conditions based on the CHO configuration information.

In an embodiment of the present application, the method may further include: in response to a radio link failure in a MCG, initiating a fast MCG link recovery procedure and starting a timer associated with the fast MCG link recovery procedure; and stopping evaluating the set of execution conditions after initiating the fast MCG link recovery procedure.

In another embodiment of the present application, the method may further include: in response to a radio link failure in a MCG, initiating a fast MCG link recovery procedure and starting a timer associated with the fast MCG link recovery procedure; and not performing a CHO procedure during the fast MCG link recovery procedure.

In yet another embodiment of the present application, the method may further include: performing a CHO procedure in the case that the execution condition is met and a timer associated with a fast MCG link recovery procedure is not running.

In yet another embodiment of the present application, the method may further include: in response to a radio link failure in a MCG, initiating a fast MCG link recovery procedure and starting a timer associated with the fast MCG link recovery procedure; performing a CHO procedure in the case that the execution condition is met while the timer is running; and in response to performing the CHO procedure, stopping the timer associated with the fast MCG link recovery procedure in the case the timer associated with the fast MCG link recovery procedure is running.

In yet another embodiment of the present application, the method may further include: in response to the radio link failure, transmitting MCG failure information; and receiving a radio resource control (RRC) reconfiguration message in response to the MCG failure information, wherein the RRC reconfiguration message includes a handover (HO) command for a cell, wherein the cell is one of the set of cells with the CHO configuration or another cell other than the set of cells.

According to some other embodiments of the present application, a method may include: receiving fast master cell group link recovery configuration information; starting a first timer in response to reception of a number of out-sync indications; starting the second timer in response to that a measurement report regarding the MCG is triggered; and declaring a radio link failure in a MCG in response to that the second timer expires.

Some embodiments of the present application also provide an apparatus, include: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for CHO and fast MCG link recovery. Accordingly, embodiments of the present application can define the UE behaviour when both the MCG link recovery procedure and the CHO procedure are configured for the UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Next generation radio access network (NG-RAN) supports multi-radio dual connectivity (MR-DC) operation. In the MR-DC operation, a UE with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

Figure 1:
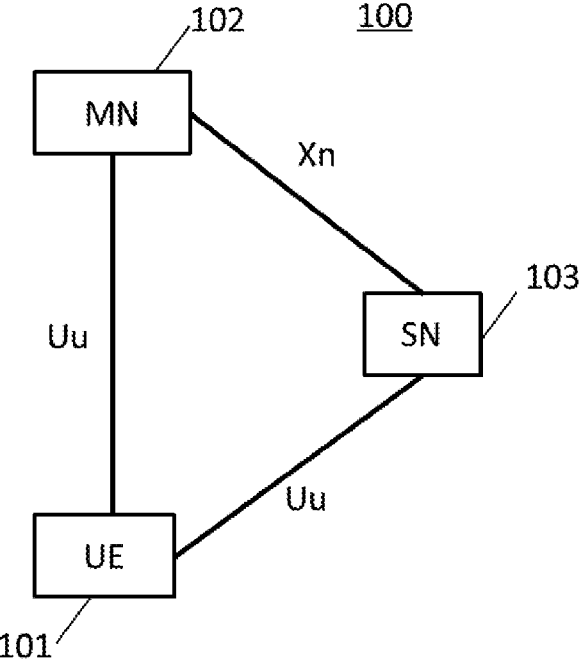
FIG. 1 illustrates a schematic diagram of a wireless communication system in accordance with some embodiments of the present application.

For example, FIG. 1 illustrates a schematic diagram of a wireless communication system in accordance with some embodiments of the present application.

As shown in FIG. 1, the wireless communication system 100 may be a dual connectivity system 100 includes at least one user equipment (UE) 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, the UE 101 may connect to the MN 102 and the SN 103 via a network interface, for example, Uu interface as specified in 3GPP standard documents. The MN 102 and the SN 103 may be connected with each other via a network interface, for example, Xn interface as specified in 3GPP standard documents. The MN 102 may be connected to the core network via a network interface (not shown in FIG. 1). The UE 102 may be configured to utilize resources provided by the MN 102 and the SN 103 to perform data transmission.

The MN 102 may refer to a radio access node that provides a control plane connection to the core network. In an embodiment of the present application, in the E-UTRA-NR DC (EN-DC) scenario, the MN may be an eNB. In another embodiment of the present application, in the next generation E-UTRA-NR DC (NGEN-DC) scenario, the MN may be an ng-eNB. In yet another embodiment of the present application, in the NR-DC scenario or the NR-E-UTRA DC (NE-DC) scenario, the MN may be a gNB.

The MN may be associated with a MCG. The MCG may refer to a group of serving cells associated with the MN, and may include a primary cell (PCell) and optionally one or more secondary cells (SCells). The PCell may provide a control plane connection to the UE 101.

The SN 103 may refer to a radio access node without control plane connection to the core network but providing additional resources to the UE. In an embodiment of the present application, in the EN-DC scenario, the SN may be an en-gNB. In another embodiment of the present application, in the NE-DC scenario, the SN may be a ng-eNB. In yet another embodiment of the present application, in the NR-DC scenario or the NGEN-DC scenario, the SN may be a gNB.

The SN may be associated with a secondary cell group (SCG). The SCG may refer to a group of serving cells associated with the SN, and may include a primary secondary cell (PSCell) and optionally one or more secondary cells (SCells).

The PCell of the MCG and the PSCell of the SCG may also be referred to as a special cell (SpCell).

In some embodiments of the present application, the UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, the UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, the UE 101 may include wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In 3GPP Release 16, a fast MCG link recovery procedure is introduced for MR-DU. The purpose of this procedure is to inform a RLF in a MCG to the MN via a SN connected to the UE, such that the UE in RRC_CONNECTED state may initiate the fast MCG link recovery procedure to quickly continue the RRC connection without performing a re-establishment procedure.

Figure 2:
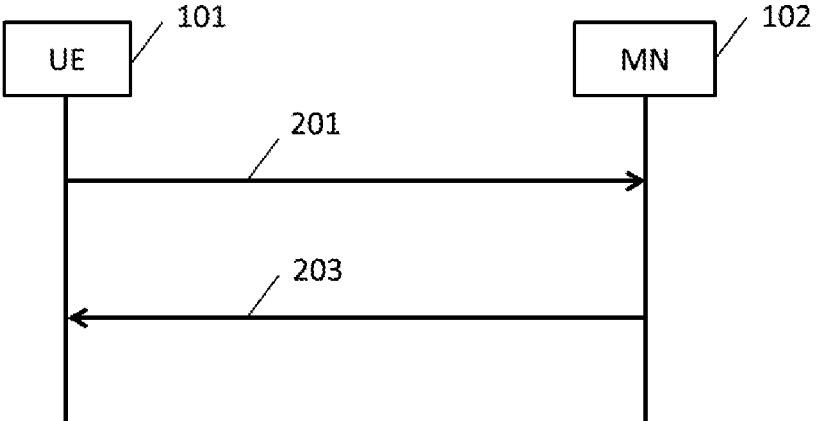
FIG. 2 illustrates an exemplary flowchart of a fast MCG link recovery procedure in accordance with some embodiments of the present application.

For example, FIG. 2 illustrates an exemplary flowchart of a fast MCG link recovery procedure in accordance with some embodiments of the present application.

As shown in FIG. 2, in the case that a RLF in a MCG for the UE 101 happens, the UE 101 may initiate (or, trigger) a fast MCG link recovery procedure. For example, in step 201, the UE 101 may transmit a message associated with the RLF to the MN 102 via the SN 103. In an embodiment of the present application, the RLF in the MCG may refer to the RLF happening in the PCell of the MCG. In an embodiment of the present application, the message associated with the RLF in step 201 may be a MCGFailureInformation message as specified in 3GPP standard documents. The UE 101 may not directly transmit the message associated with the RLF to the MN 102. Instead, the UE 101 may transmit the message associated with the RLF to the SN 103, and then the SN 103 may transfer the message received from the UE to the MN 102.

For example, the UE may be configured with a split signaling radio bearer (SRB)1 or SRB3 to report the MCG failure information when a RLF in the MCG happens. In the case that split SRB1 is configured, the UE 101 may submit the MCGFailureInformation message to low layers, e.g., for transmission via SRB1. In the case that SRB3 is configured, the UE 101 may submit the MCGFailureInformation message to low layers for transmission via SRB3. For example, the MCGFailureInformation message may be embedded in NR RRC message ULInformationTransferMRDC as specified in 3GPP standard documents for transmission via SRB3.

When or after transmitting the message in step 201, the UE 201 may start a timer associated with a fast MCG link recovery procedure. In an embodiment of the present application, the timer associated with a fast MCG link recovery procedure may be T316 as specified in 3GPP standard documents.

After receiving the message associated with the RLF, in step 202, the MN 102 may transmit a response message to the UE 101. The response message in step 202 may be a RRC reconfiguration message including a handover (HO) command for a cell or a RRC release message. In an embodiment of the present application, the handover command may be a reconfigurationWithSync configuration as specified in 3GPP standard documents. The MN 102 may not directly transmit the response message to the UE 101. Instead, the MN 102 may transmit the response message to the SN 103, and then the SN 103 may transfer the response message to the UE 101.

For example, in the case that SRB3 is configured for transmitting the message associated with the RLF, after receiving the response message from the MN 102, the SN 103 may encapsulate the response message in a DLInformationTransferMRDC message as specified in 3GPP standard documents, and then transmit the DLInformationTransferMRDC message to the UE 101.

Before the timer, e.g., T316 expires, in the case that the UE 101 receives one of the RRC reconfiguration message or the RRC release message, the UE 101 shall stop the timer, which means that the fast MCG link recovery procedure is terminated. In the case that the UE 101 receives the RRC reconfiguration message including handover command for a cell, the UE may perform handover for the UE to the cell. In the case that the UE 101 receives the RRC release message, then the UE shall enter a RRC_IDLE state.

The UE does not receive any response message from the MN 102 before the timer expires in some embodiments of the present application. The UE 101 performs a RRC re-establishment procedure after the timer expires.

In addition, the UE 101 may also be configured with a CHO procedure. The CHO procedure is defined as a handover procedure that is executed by the UE when one or more handover execution conditions are met. In the CHO procedure, a UE may start evaluating execution condition(s) after receiving the CHO configuration information, and stop evaluating the execution condition during the CHO execution once the execution condition(s) is met.

Figure 3:
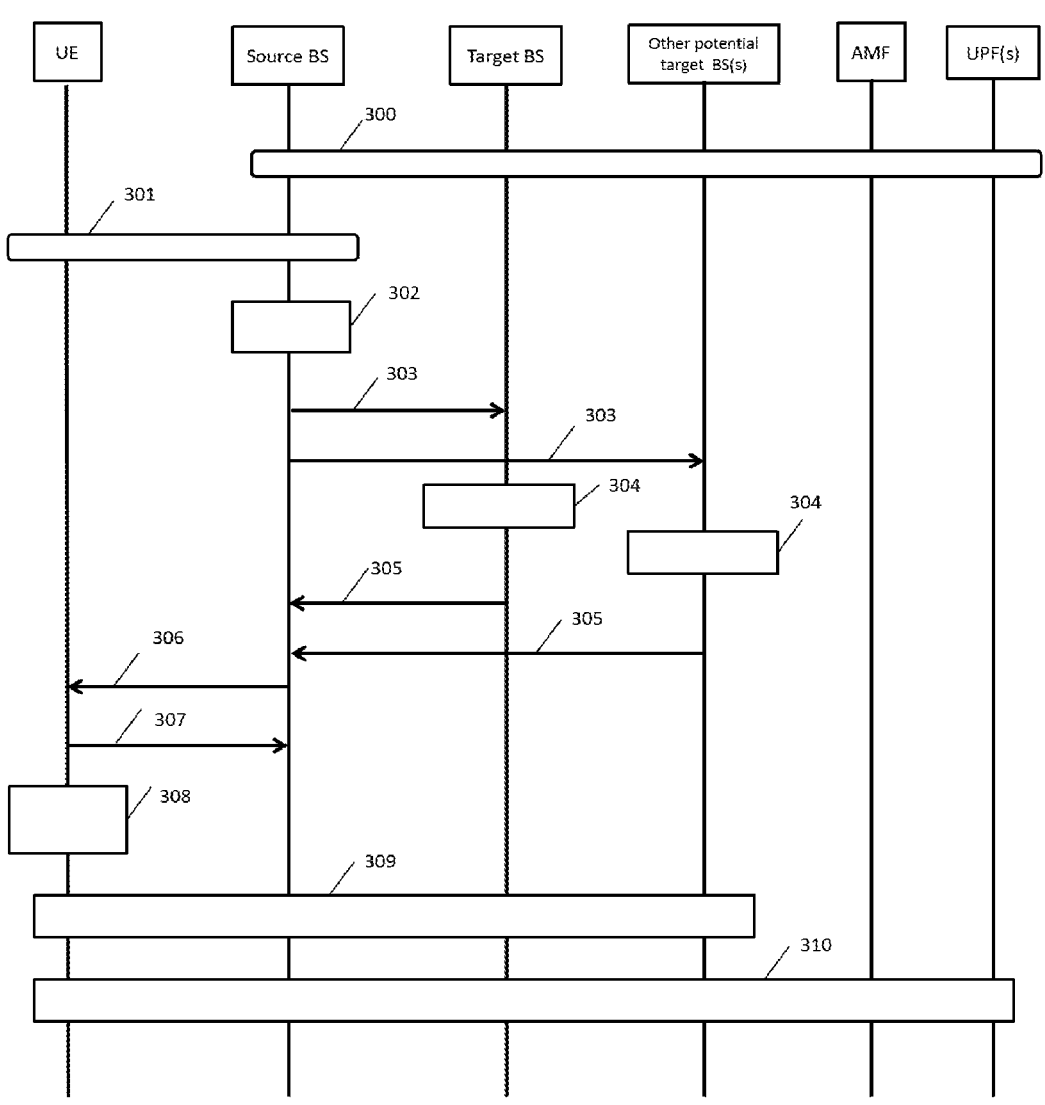
FIG. 3 illustrates an exemplary flowchart of a CHO procedure in accordance with some embodiments of the present application.

For example, FIG. 3 illustrates an exemplary flowchart of a CHO procedure in accordance with some embodiments of the present application. As shown in FIG. 3, it depicts a basic conditional handover scenario where neither the access and mobility management function (AMF) nor the user plane functions (UPFs) changes.

Referring to FIG. 3, in step 300, an AMF may provide the UE context of a UE to the source base station (BS). The UE context may contain information regarding roaming and access restrictions of the UE.

In step 301, the source BS may transmit measurement configuration information to the UE. The UE may report the measurement result to the source BS based on the measurement configuration information.

In step 302, the source BS may decide to use a CHO for the UE, which may be based on the measurement result reported by the UE.

In step 303, the source BS may transmit a CHO request message to one or more candidate BSs. For example, the one or more candidate BSs may include a target BS and other potential target BS(s).

In step 304, the target BS and other potential target BS(s) may perform admission control to decide whether to allow the CHO of the UE after receiving the CHO request message from the source BS.

In step 305, based on the admission control result, at least one of the target BS and other potential target BS(s) may transmit a CHO response message to the source BS. The CHO response message may include CHO configuration for one or more candidate cells.

In step 306, the source BS may transmit a RRC reconfiguration message to the UE. The RRC reconfiguration message may include conditional handover (CHO) configuration information indicating a set of CHO configurations and a set of execution conditions for a set of cells, each cell is associated with a CHO configuration and an execution condition. The set of cells may include the one or more candidate cells provided by at least one of the target BS and other potential target BS(s).

The CHO configuration associated with a cell may include parameters for the UE to perform handover to the cell. For example, the CHO configuration associated with a cell may include parameters for the UE to access the cell and/or perform data transmission with the cell.

The execution condition may include one or two trigger conditions. For example, in the case that the execution condition includes one trigger condition, the trigger condition may be an A3 event or an A5 event as specified in 3GPP standard document TS38.331. In the case that the execution condition includes two trigger conditions, the two trigger conditions may be an A3 event and an A5 event as specified in 3GPP standard document TS38.331. In addition, only a single reference signal (RS) type may be used for evaluating the execution condition of a single cell and at most two different execution quantities can be configured simultaneously for evaluating the execution condition of a single cell. For example, the two different execution quantities may be reference signal receiving power (RSRP) and reference signal receiving quality (RSRQ), or RSRP and signal to interference plus noise ratio (SINR), or the like. In some embodiments of the present application, more than one execution condition may be satisfied, that is, more than one cell is suitable for the UE's handover. In this case, the UE can select a cell for performing CHO based on the execution quantity.

After receiving the RRC reconfiguration message, in step 307, the UE may transmit a RRC reconfiguration complete message to the source BS.

In step 308, the UE may maintain the connection with the source BS and start evaluating the set of execution conditions for the set of cells. Before any execution condition is satisfied, when receiving a handover (HO) command without CHO configuration, the UE may perform the HO procedure regardless of any previously received CHO configuration information. Otherwise, in the case that at least one execution condition for at least one cell is satisfied, in step 309, the UE may detach from the source BS and perform (or apply) a CHO procedure to a cell selected from the at least one cell. The selected cell may be referred to as a target cell.

Performing a CHO procedure to the selected cell may include applying the corresponding CHO configuration for the selected cell. When performing the CHO procedure, i.e., from the time when the UE starts synchronization with the selected cell, the UE does not monitor the source BS anymore. The UE may complete the CHO procedure by transmitting a RRC reconfiguration complete message to the target cell.

In step 310, the UE, the source BS, the target BS, and the core network (e.g., AMF and/or UPF(s)) may perform data forwarding and path switch.

As stated above, both the MCG link recovery procedure and the CHO procedure may be configured for a UE. However, how to handle the association between a fast MCG link recovery procedure and a CHO procedure have not been discussed in 3GPP 5G NR technology yet.

For example, when RLF in a MCG happens, UE may initiate a fast MCG link recovery procedure. In addition, CHO condition(s) may be met during the fast MCG link recovery procedure. In such cases, the UE behavior needs to be further defined.

Embodiments of the present application can provide solutions for CHO and fast MCG link recovery. Accordingly, embodiments of the present application can define the UE behavior when both the MCG link recovery procedure and the CHO procedure are configured for the UE. More details on embodiments of the present application will be illustrated in the following text in combination with the appended drawings.

Figure 4:
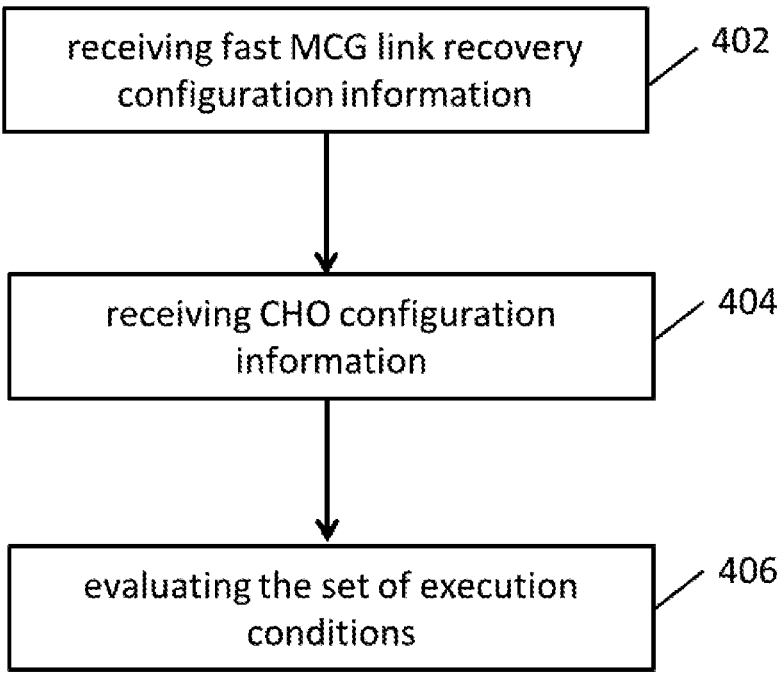
FIG. 4 illustrates a flow chart of a method for CHO and fast MCG link recovery in accordance with some embodiments of the present application.

FIG. 4 illustrates a flow chart of a method for CHO and fast MCG link recovery in accordance with some embodiments of the present application. The method may be performed by a UE 101 as shown in FIG. 1. For example, the UE 101 may be in the MR-DC scenario where the UE 101 connects to an MN 102 and an SN 103.

As shown in FIG. 4, in step 402, the UE 101 may receive fast MCG link recovery configuration information from a BS, for example, the MN 102 as shown in FIG. 1. When the UE 101 receives the fast MCG link recovery configuration information, the UE 101 is allowed to use a fast MCG link recovery procedure when a RLF in a MCG happens. In an embodiment of the present application, the fast MCG link recovery configuration information may include a value for a timer associated with the fast MCG link recovery procedure. For example, the timer may be T316 as specified in 3GPP standard documents.

In addition to the fast MCG link recovery configuration information, in step 404, the UE 101 may also receive CHO configuration information indicating a set of CHO configurations and a set of execution conditions for a set of cells, wherein each cell is associated with a CHO configuration and an execution condition. The set of CHO configurations means one or more CHO configurations, the set of execution conditions means one or more execution conditions, and the set of cells means one or more cells. In some embodiments of the present application, the set of cells includes one or more candidate cells indicated in the CHO configuration message from at least one of the target BS and other potential target BS(s), as shown in step 305 of FIG. 3.

The CHO configuration associated with a cell may include parameters for the UE to perform handover to the cell. For example, the CHO configuration associated with a cell includes parameters for the UE to access the cell and/or perform data transmission with the cell.

The execution condition includes one or two trigger conditions. For example, in the case that the execution condition includes one trigger condition, the trigger condition may be an A3 event or an A5 event as specified in 3GPP standard document TS38.331. In the case that the execution condition includes two trigger conditions, the two trigger conditions may be n A3 event and an A5 event as specified in 3GPP standard document TS38.331. In addition, only a single RS type may be used for evaluating the execution condition of a single cell and at most two different execution quantities can be configured simultaneously for evaluating the execution condition of a single cell. For example, the two different execution quantities may be RSRP and RSRQ, or RSRP and SINR, or the like.

Although FIG. 4 shows that step 404 occurs after step 402, step 404 may actually, occur before step 402 or simultaneously with step 402.

After receiving the CHO configuration information, the UE 101 evaluates the set of execution conditions based on the CHO configuration information. For example, for each cell of the set of cells, the UE may measure the execution quantities (for example, RSRP and RSRQ) of the reference signal (for example, channel state information reference signal) for the cell, and evaluate whether the one or two trigger conditions (for example, A3 and/or A5) for the cell is satisfied. In some embodiments of the present application, more than one execution condition may be satisfied, that is, more than one cell is suitable for the UE's handover. In this case, the UE can select a cell for performing CHO based on the execution condition.

During UE 101 evaluating the set of execution conditions based on the CHO configuration information, a RLF in a MCG may happen. According to some embodiments of the present application, the UE 101 declares a radio link failure in a MCG in response to one of: an out-of-sync timer expires, a random access problem occurs, a maximum number of retransmissions has been reached, and a timer started in response to that a measurement report is triggered expires.

In an embodiment of the present application, the out-of-sync timer may be T310 as specified in 3GPP standard documents. For example, the T310 may be started when detecting physical layer problems for the SpCell, i.e. when receiving a number of consecutive out-of-sync indications from lower layers. The number of consecutive out-of-sync indications may be N310 as specified in 3GPP standard documents.

In another embodiment of the present application, the random access problem may be indicated by an indication from a MCG medium access control (MAC) layer.

In yet another embodiment of the present application, a maximum number of retransmissions being reached may be indicated by an indication from a MCG radio link control (RLC) layer.

In yet another embodiment of the present application, the timer started in response to that a measurement report is triggered may be T312 as specified in 3GPP standard documents. For example, the T312 may be started while T310 is running.

According to some embodiments of the present application, in response to the radio link failure in the MCG, the UE initiates a fast MCG link recovery procedure as shown in FIG. 2, and starts a timer associated with the fast MCG link recovery procedure. For example, the timer associated with the fast MCG link recovery procedure may be T316 as specified in 3GPP standard documents.

In an embodiment of the present application, the UE 101 may stop evaluating the set of execution conditions after initiating the fast MCG link recovery procedure. In another embodiment of the present application, the UE 101 may not perform a CHO procedure during the fast MCG link recovery procedure. In other words, the UE may not perform a CHO procedure when the timer (e.g., T316) associated with the fast MCG link recovery procedure is running. For example, performing a CHO procedure may include applying the CHO configuration for a cell for which the execution condition is met.

According to some other embodiments of the present application, whether to perform a CHO procedure may be based on whether the timer (e.g., T316) associated with the fast MCG link recovery procedure) is running. In an embodiment of the present application, in the case that the execution condition for a cell is met and a timer (e.g., T316) associated with a fast MCG link recovery procedure is not running, the UE may perform a CHO procedure for the cell for which the execution condition is met. In other words, the UE 101 may apply the CHO configuration for a cell in the case that the execution condition for the cell is met and a timer associated with a fast MCG link recovery procedure is not running.

According to some embodiments of the present application, in response to the radio link failure in the MCG, the UE may initiate a fast MCG link recovery procedure as shown in FIG. 2, and start a timer associated with the fast MCG link recovery procedure. For example, the timer associated with the fast MCG link recovery procedure may be T316 as specified in 3GPP standard documents. In some embodiments of the present application, in the case that the execution condition for a cell is met while the timer is running, the UE 101 may also perform a CHO procedure for the cell. Accordingly, in response to performing the CHO procedure, the UE may stop the timer associated with the fast MCG link recovery procedure.

In another embodiment of the present application, the UE may resume a part of radio bearers (RBs) or all RBs that were suspended when initiating the fast MCG link recovery procedure.

In yet another embodiment of the present application, the UE may transmit a RRC indication of performing a CHO procedure to the MN 102. For example, the RRC indication may be transmitted to the MN 102 via the SN 103.

In yet another embodiment of the present application, the UE may release a connection with a SN (for example, SN 103 as shown in FIG. 1). For example, the UE may resume release a connection with a SN when the execution condition for a cell is met.

According to some embodiments of the present application, in response to the radio link failure in the MCG, the UE may initiate a fast MCG link recovery procedure as shown in FIG. 2. During the fast MCG link recovery procedure, the UE 101 may receive a RRC reconfiguration message including a HO command (e.g., a reconfiguration WithSync configuration) for a cell (e.g., cell A). The UE 101 may perform the HO to the cell A according to the HO command. In the case that the HO to the cell fails, the UE may initiate a re-establishment procedure. During the re-establishment procedure, in the case that cell A with CHO configuration is selected, the UE may perform a CHO procedure for cell A. However, performing a CHO procedure for cell A may also fail because: 1) CHO configuration may have been updated already; and 2) even if the CHO configuration of cell A has not been modified, the CHO procedure for cell A will fail again since HO fails just now.

To prevent the UE 101 from repeating the meaningless CHO procedure, according to some embodiments of the present application, in response to the RLF in a MCG, the UE 101 may transmit MCG failure information to the MN 102. The MCG failure information may indicate a failure type. In the case that the RLF in the MCG is declared based on that an out-of-sync timer (e.g., T310) expires, the UE may set the failure type to be t310-expiry. In the case that the RLF in the MCG is declared based on that a random access problem occurs, the UE may set the failure type to be randomAaccessProblem. In the case that the RLF in the MCG is declared based on that a maximum number of retransmissions has been reached, the UE may set the failure type to be rlc-MaxNumRetx. In the case that the RLF in the MCG is declared based on that a timer (e.g., T312) started in response to that a measurement report is triggered expires, the UE may set the failure type to be t312-expiry.

The UE may receive a RRC reconfiguration message in response to the MCG failure information. The RRC reconfiguration message may include a HO command for a cell. The cell may be one of the set of cells with the CHO configuration or another cell other than the set of cells.

In an embodiment of the present application, in the case that the cell is one of the set of cells with the CHO configuration, the UE 101 may remove the CHO configuration for the cell, such that the UE 101 may not perform the CHO procedure for the cell.

In another embodiment of the present application, in addition to the HO command, the RRC reconfiguration message may also include at least one of: information regarding modifying a CHO configuration for at least one cell of the set of cells; and information regarding removing a CHO configuration for at least one cell of the set of cells. After receiving the RRC reconfiguration message, the UE may not perform the CHO procedure for the cell that for which the CHO configuration is removed.

As stated above, T310 expiry as specified in 3GPP standard documents may be used to declare the RLF in the MCG and used to initiate a fast MCG link recovery procedure. However, T310 usually has a relatively long time period. In some cases, initiating a fast MCG link recovery procedure after T310 expiry may affect transmission efficiency of the UE. Given this, embodiments of the present application also provide solutions for improving fast MCG link recovery such that the fast MCG link recovery procedure may be initiated according to a timer with relatively short time period.

Figure 5:
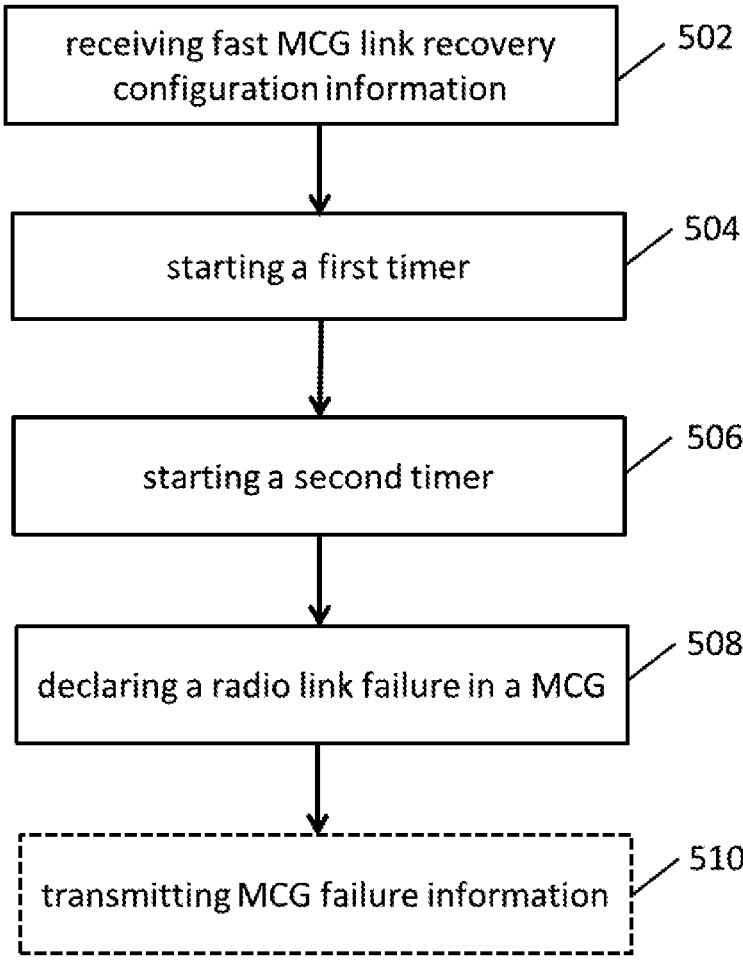
FIG. 5 illustrates a flow chart of a method for fast MCG link recovery in accordance with some embodiments of the present application.

For example, FIG. 5 illustrates a flow chart of a method for fast MCG link recovery in accordance with some embodiments of the present application. The method may be performed by a UE 101 as shown in FIG. 1. For example, the UE 101 may be in the MR-DC scenario where the UE 101 connects to the MN 102 and the SN 103.

As shown in FIG. 5, in step 502, the UE 101 may receive fast MCG link recovery configuration information from a BS, for example, the MN 102 as shown in FIG. 1. When the UE 101 receives the fast MCG link recovery configuration information, the UE 101 may use a fast MCG link recovery procedure when a RLF in a MCG happens. In an embodiment of the present application, the fast MCG link recovery configuration information includes a value for a timer associated with the fast MCG link recovery procedure. For example, the timer may be T316 as specified in 3GPP standard documents.

In step 504, in response to reception of a number of out-sync indications, the UE may start a first timer. In an embodiment of the present application, the number of out-sync indications may be the number of consecutive out-sync indications. In another embodiment of the present application, the number of consecutive out-of-sync indications may be N310 as specified in 3GPP standard documents. In yet another embodiment of the present application, the first timer may be T310 as specified in 3GPP standard documents.

At step 506, in response to that a measurement report regarding the MCG is triggered by the UE 101, the UE 101 may start a second timer. In an embodiment of the present application, the second timer started in response to that a measurement report is triggered may be T312 as specified in 3GPP standard documents.

In step 508, the UE 101 may declare a radio link failure in a MCG in response to that the second timer expires.

In an embodiment of the present application, in response to the radio link failure in the MCG, the UE 101 may initiate a fast MCG link recovery procedure, for example, as shown in FIG. 2. The UE 101 may also stop the first timer.

In another embodiment of the present application, in step 510, in response to the radio link failure in the MCG, the UE 101 may transmit MCG failure information indicating a failure type due to that the second timer expires to the MN. For example, the UE may set the failure type to be t312-expiry.

Different from the existing technology where UE may initiate a RRC re-establishment procedure in the case that T312 expires, embodiments of the present application provide a technical solution where T312 expiry is used to declare the RLF in the MCG and initiate the fast initiate a fast MCG link recovery procedure.

Figure 6:
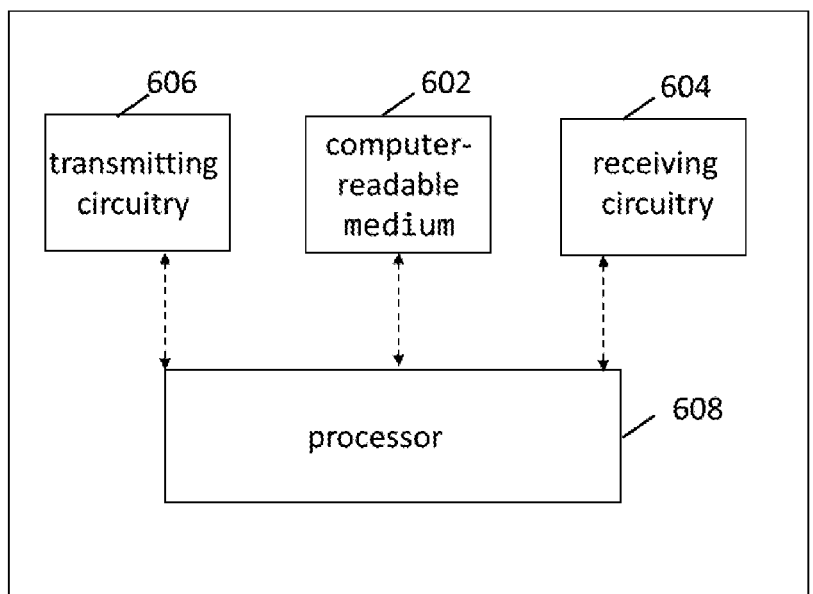
FIG. 6 illustrates a simplified block diagram of an apparatus 600 for CHO and fast MCG link recovery according to some embodiments of the present application.

FIG. 6 illustrates a simplified block diagram of an apparatus 600 for CHO and fast MCG link recovery according to some embodiments of the present application. The apparatus 600 may be a UE 101 as shown in FIG. 1.

Referring to FIG. 6, the apparatus 600 may include at least one non-transitory computer-readable medium 602, at least one receiving circuitry 604, at least one transmitting circuitry 606, and at least one processor 608. In some embodiment of the present application, at least one receiving circuitry 604 and at least one transmitting circuitry 606 and be integrated into at least one transceiver. The at least one non-transitory computer-readable medium 602 may have computer executable instructions stored therein. The at least one processor 608 may be coupled to the at least one non-transitory computer-readable medium 602, the at least one receiving circuitry 604 and the at least one transmitting circuitry 606. The computer executable instructions can be programmed to implement a method with the at least one receiving circuitry 604, the at least one transmitting circuitry

606 and the at least one processor 608 The method can be a method according to an embodiment of the present application, for example, the method shown in FIG. 4.

Figure 7:
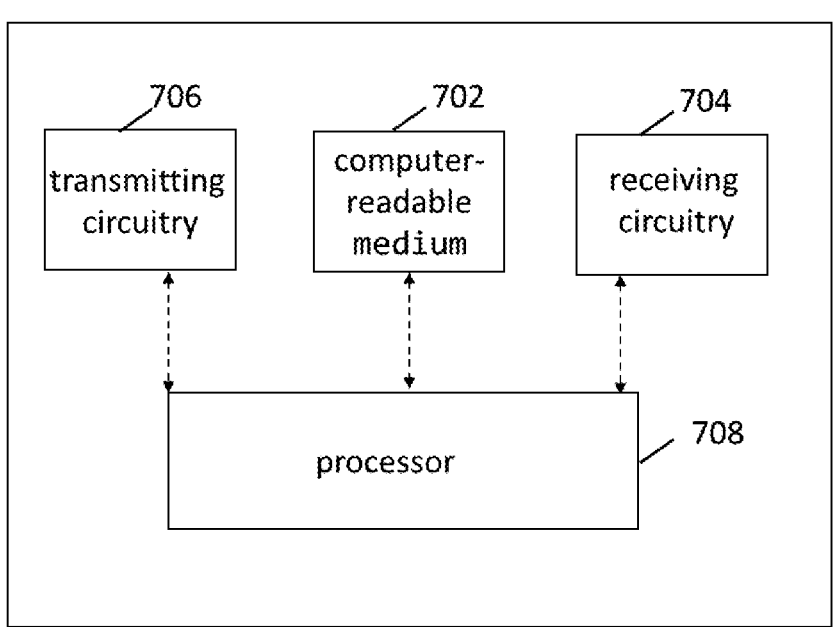
FIG. 7 illustrates a simplified block diagram of an apparatus 700 for fast MCG link recovery according to some embodiments of the present application.

FIG. 7 illustrates a simplified block diagram of an apparatus 700 for fast MCG link recovery according to some embodiments of the present application. The apparatus 700 may be a UE 101 as shown in FIG. 1.

Referring to FIG. 7, the apparatus 700 may include at least one non-transitory computer-readable medium 702, at least one receiving circuitry 704, at least one transmitting circuitry 706, and at least one processor 708. In some embodiment of the present application, at least one receiving circuitry 704 and at least one transmitting circuitry 706 and be integrated into at least one transceiver. The at least one non-transitory computer-readable medium 702 may have computer executable instructions stored therein. The at least one processor 708 may be coupled to the at least one non-transitory computer-readable medium 702, the at least one receiving circuitry 704 and the at least one transmitting circuitry 706. The computer executable instructions can be programmed to implement a method with the at least one receiving circuitry 704, the at least one transmitting circuitry 706 and the at least one processor 708 The method can be a method according to an embodiment of the present application, for example, the method shown in FIG. 5.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method performed by a user equipment (UE), the method comprising:

receiving fast master cell group (MCG) link recovery configuration information;

receiving conditional handover (CHO) configuration information indicating a set of CHO configurations and a set of execution conditions for a set of cells, each cell is associated with a CHO configuration and an execution condition;

evaluating the set of execution conditions based on the CHO configuration information; and based at least in part on a radio link failure in a MCG, initiating a fast MCG link recovery procedure, starting a timer associated with the fast MCG link recovery procedure, and stopping the evaluating the set of execution conditions.

2. The method of claim 1, further comprising:

not performing a CHO procedure during the fast MCG link recovery procedure.

3. The method of claim 1, further comprising:

not performing a CHO procedure when the timer associated with the fast MCG link recovery procedure is running.

4. The method of claim 1, further comprising:

performing a CHO procedure if the execution condition is met and the timer associated with the fast MCG link recovery procedure is not running.

5. The method of claim 1, further comprising:

applying the CHO configuration if the execution condition is met and the timer associated with the fast MCG link recovery procedure is not running.

6. The method of claim 1, further comprising:

performing a CHO procedure if the execution condition is met while the timer associated with the fast MCG link recovery procedure is running.

7. The method of claim 6, further comprising:

in response to performing the CHO procedure, stopping the timer associated with the fast MCG link recovery procedure if the timer associated with the fast MCG link recovery procedure is running.

8. A user equipment (UE) for wireless communication, comprising:

at least one memory; and at least one processor coupled with the at least one memory and configured to cause the UE to:

receive fast master cell group (MCG) link recovery configuration information;

receive conditional handover (CHO) configuration information indicating a set of CHO configurations and a set of execution conditions for a set of cells, each cell is associated with a CHO configuration and an execution condition;

evaluate the set of execution conditions based on the CHO configuration information; and based at least in part on a radio link failure in a MCG, initiate a fast MCG link recovery procedure, start a timer associated with the fast MCG link recovery procedure, and stop the evaluation of the set of execution conditions.

9. The UE of claim 8, wherein the at least one processor is configured to cause the UE to not perform a CHO procedure during the fast MCG link recovery procedure.

10. The UE of claim 8, wherein the at least one processor is configured to cause the UE to not perform a CHO procedure when the timer associated with the fast MCG link recovery procedure is running.

11. The UE of claim 8, wherein the at least one processor is configured to cause the UE to perform a CHO procedure if the execution condition is met and the timer associated with the fast MCG link recovery procedure is not running.

12. The UE of claim 8, wherein the at least one processor is configured to cause the UE to apply the CHO configuration if the execution condition is met and the timer associated with the fast MCG link recovery procedure is not running.

13. The UE of claim 8, wherein the at least one processor is configured to cause the UE to perform a CHO procedure if the execution condition is met while the timer associated with the fast MCG link recovery procedure is running.

14. A processor for wireless communication, comprising:

at least one controller coupled with at least one memory and configured to cause the processor to:

receive fast master cell group (MCG) link recovery configuration information;

receive conditional handover (CHO) configuration information indicating a set of CHO configurations and a set of execution conditions for a set of cells, each cell is associated with a CHO configuration and an execution condition;

evaluate the set of execution conditions based on the CHO configuration information; and based in part on a radio link failure in a MCG, initiate a fast MCG link recovery procedure, start a timer associated with the fast MCG link recovery procedure, and stop the evaluation of the set of execution conditions.

15. The processor of claim 14, wherein the at least one controller coupled with at least one memory is configured to cause the processor to not perform a CHO procedure during the fast MCG link recovery procedure.

16. The processor of claim 14, wherein the at least one controller coupled with at least one memory is configured to cause the processor to not perform a CHO procedure when the timer associated with the fast MCG link recovery procedure is running.

17. The processor of claim 14, wherein the at least one controller coupled with at least one memory is configured to cause the processor to perform a CHO procedure if the execution condition is met and the timer associated with the fast MCG link recovery procedure is not running.

18. The processor of claim 14, wherein the at least one controller coupled with at least one memory is configured to cause the processor to apply the CHO configuration if the execution condition is met and the timer associated with the fast MCG link recovery procedure is not running.

19. The processor of claim 14, wherein the at least one controller coupled with at least one memory is configured to cause the processor to, in response to a radio link failure in a MCG, perform a CHO procedure if the execution condition is met while the timer associated with the fast MCG link recovery procedure is running.

20. The UE of claim 8, wherein the at least one processor is configured to cause the UE to, in response to performing the CHO procedure, stop the timer associated with the fast MCG link recovery procedure if the timer associated with the fast MCG link recovery procedure is running.

* * * * *